United States Patent [19]

Christner et al.

[11] 4,115,528

[45] Sep. 19, 1978

[54] METHOD FOR FABRICATING A CARBON ELECTRODE SUBSTRATE

[75] Inventors: Larry G. Christner, Glastonbury, Conn.; Dennis C. Nagle, Catonsville, Md.; Paul R. Watson, Marlborough, Conn.

[73] Assignee: United Technologies Corporation, Hartford, Conn.

[21] Appl. No.: 824,751

[22] Filed: Aug. 15, 1977

[51] Int. Cl.$^2$ .................. C01B 31/02; B29C 25/00
[52] U.S. Cl. ..................... 423/449; 264/29.5; 423/445; 423/447.1; 429/45
[58] Field of Search ............ 423/449, 445, 447.1, 423/448; 264/29.1, 29.5; 429/44, 45, 232, 218; 427/228; 106/56; 252/502

[56] References Cited

U.S. PATENT DOCUMENTS

| 3,198,714 | 8/1965 | Johnson et al. | 264/29.7 |
|---|---|---|---|
| 3,201,330 | 8/1965 | Price | 264/29.7 |
| 3,367,812 | 2/1968 | Watts | 423/447.2 X |
| 3,407,038 | 10/1968 | Beasley | 423/447.2 |
| 3,573,086 | 3/1971 | Lambdin | 264/29.5 |
| 4,041,116 | 8/1977 | Baud et al. | 264/29.5 |

*Primary Examiner*—Edward J. Meros
*Attorney, Agent, or Firm*—Stephen E. Revis

[57] ABSTRACT

A method for fabricating porous carbon sheet material and in particular for fabricating porous carbon fuel cell electrode substrates comprises coating carbon fibers with a mixture of furfuryl alcohol and a catalyst which polymerizes furfuryl alcohol, forming the fibers into a mat or sheet of the desired size and thickness, heating the mat to polymerize the furfuryl alcohol and to cure the resin so formed, and further heating the mat to carbonize the resin.

Phosphoric acid is the preferred polymerization catalyst when the sheet material is to be used as a fuel cell electrode substrate. The method produces electrode substrates which are highly porous yet strong and which are also corrosion resistant, thermally conductive and electrically conductive.

9 Claims, No Drawings

METHOD FOR FABRICATING A CARBON ELECTRODE SUBSTRATE

BACKGROUND OF THE INVENTION

1. Field of the Invention - This invention relates to a method for making a porous carbon article, and more particularly for making an electrode substrate for use in an electrochemical cell such as a fuel cell.

2. Description of the Prior Art - Many methods are known for fabricating porous carbon articles and porous carbon paper, such as might be used as an electrode substrate in an electrochemical cell such as a fuel cell. One method for forming porous carbon paper is described in U.S. Pat. No. 3,829,327. The paper made by the method of that patent is claimed to have good chemical, thermal and structural stability, as well as gas permeability and high electrical conductivity. The method described therein basically involves coating a web of carbon fibers with carbon by a chemical vapor deposition process. The deposition of carbon improves the electrical conductivity of the carbon web, bonds the carbon fibers together, and improves the overall strength of the paper. The process, however, is expensive, in view of the vapor deposition step. Furthermore, at high porosities the paper may not have a strength as high as desirable for certain applications.

Another method for producing a porous carbon sheet is described in U.S. Pat. No. 3,991,169. In that method an alcohol having a boiling point of greater than 150° C. is used as a preliminary binder to form a pitch fiber mat. The mat is then heat treated, including carbonizing in a nonoxidizing atmosphere. During the heat treating the alcohol is burned off while the individual fibers in the mat are fused and bonded to one another at their points of contact.

Two other patents which are representative of the art of making porous carbon sheets are U.S. Pat. Nos. 3,628,984 and 3,960,601. Neither of these methods nor the preceding methods provides the strength, electrical conductivity, porosity, and corrosion protection necessary for certain demanding applications such as for fuel cell electrode substrate applications.

SUMMARY OF THE INVENTION

One object of the present invention is a less expensive method for manufacturing porous carbon sheet material.

Another object of the present invention is a method for making highly porous carbon sheet material which also has good strength.

A further object of the present invention is a method for making a fuel cell electrode substrate which is gas permeable, thermally conductive, electrically conductive, corrosion resistant to phosphoric acid, and strong.

According to the present invention, a method for fabricating porous carbon sheet material comprises coating carbon fibers with a mixture of furfuryl alcohol and a polymerization catalyst, forming a mat of the coated fibers, polymerizing the furfuryl alcohol and curing the mat by heating the mat, and carbonizing the cured mat.

In a preferred embodiment the method is used to fabricate fuel cell electrode substrates. In the preferred embodiment the polymerization catalyst is phosphoric acid which has been diluted with water. To make the electrode substrate chopped carbon pitch fibers (i.e., carbon fibers made from pitch) are dispersed in a bath of furfuryl alcohol, phosphoric acid and water. The mixture is filtered through a screen to remove excess liquid, leaving behind a mat of carbon fibers which have been coated with the bath mixture. The mat is heated to polymerize the furfuryl alcohol and to cure the resin so formed. The mat is then carbonized to improve its corrosion resistance to the phosphoric acid fuel cell environment in which it is to be used. In forming a fuel cell electrode from this substrate a suitable catalyst layer is applied to one surface of the substrate by any known method. A typical catalyst layer comprises a mixture of platinum (supported on carbon particles) and polytetrafluoroethylene (as a binder/wetproofing agent). If required the carbon fiber substrate may be impregnated with a wetproofing agent such as polytetrafluoroethylene.

When compared to other methods which we have used and considered for use in making fuel cell electrode substrates, the present method yields parts with higher porosities without sacrificing strength, corrosion resistance, and thermal and electrical conductivity. Furthermore, the method is economical.

DESCRIPTION OF THE PREFERRED EMBODIMENT

An exemplary embodiment of the present invention is a method for fabricating an electrode substrate for use in a phosphoric acid fuel cell. In this exemplary embodiment the starting material for the substrate is carbon fibers made from pitch, although any carbon fiber may be used. The fibers should be less than about 2 inches in length to make it easier to form a sheet with uniform and non-directional properties. Fibers considerably shorter than 2 inches, such as on the order of about 0.100 inch, are preferred.

The mixture for coating the fibers is prepared by combining appropriate amounts of furfuryl alcohol, phosphoric acid, and water. Phosphoric acid is the preferred polymerization catalyst if the electrode substrate is to be used in a phosphoric acid fuel cell since its use does not appear to have any harmful effects on the performance and life of the finished product. In other applications other polymerization catalysts may be more suitable. Examples of other catalysts which will polymerize furfuryl alcohol and which may be used in the method of the present invention are hydrochloric acid, maleic acid, maleic anhydride, and toluene sulfonic acid.

Any method for applying a uniform coating of the mixture on the fibers may be used in the present method. We prefer to prepare a bath containing the furfuryl alcohol, phosphoric acid, and water. The carbon fibers are placed in a box frame having a removable screen bottom. The dimensions of the screen are the dimensions of the sheet which is to be made. The amount of fibers placed on the screen is predetermined to yield a sheet having the desired thickness. The box is lowered into the bath. The fibers form a slurry in the box and after several minutes settle back onto the screen in a uniform layer. The box and screen are lifted out of the bath and the screen removed from the frame. The layer of coated fibers is flipped upside down onto a drying screen and allowed to drain. In order to be able to obtain a uniformly thick fiber mat the viscosity of the liquid mixture which coats the fibers should be low, which is herein and in the claims intended to mean on the order of the viscosity of water. If the bath is too viscous the fibers may not settle back onto the screen, or if they do settle it may not be in a uniform manner or settling may take too long. Viscosity of the bath increases as the furfuryl alcohol polymerizes. The mixture should retain its low viscosity for at least several hours so that a reasonable number of parts can be made before the mixture is unusable. Since the rate of polymerization is controlled by the amounts of catalyst and water in the mixture, such amounts must be carefully controlled. Enough catalyst must be present to assure polymerization upon heating of the mat; yet enough water must be present in relation to the amount of catalyst to prevent too rapid polymerization of the bath mixture at room temperature.

Although in this embodiment the mixture of furfuryl alcohol, phosphoric acid, and water is prepared before the carbon fibers are added, we do not believe that this is critical to the invention. For example, the carbon pitch fibers could first be dispersed in furfuryl alcohol. A mixture of water and phosphoric acid can then be added to the dispersion.

The next step in this exemplary method is to heat the mat to polymerize the furfuryl alcohol and to cure the resin so formed. It is preferred to use a temperature between 50° and 200° C. An especially preferred range is between 100° and 150° C. It is also preferred to polymerize and cure in an oxidizing atmosphere since it appears to have a beneficial effect, at least with regard to electrode substrates. Polymerization and curing in an oxidizing atmosphere may be unimportant if the carbon sheet is to be used for other applications.

Some of the furfuryl alcohol will evaporate during heating before it polymerizes; and, therefore, when heating in an enclosed oxidizing atmosphere care must be taken to assure the flammability limit of the alcohol vapor is not reached since an explosion can result. Furthermore, if the mat is heated too fast the alcohol will evaporate much more rapidly than it will polymerize and too little polymer may be left behind on the fibers resulting in a mat with insufficient strength. For these reasons it is preferred to polymerize and cure the mat at a temperature no greater than about 200° C.

The strength of the mat is directly dependent upon the amount of polymer formed at the junction between fibers. During the initial stages of polymerization the heating of the mat causes a redistribution or migration of the coating toward the junctions. Proper redistribution appears to be required in order to obtain adequate strength in the mat. If polymerization is allowed to occur very slowly, such as at room temperature or at temperatures below about 50° C., this redistribution or migration may not occur to a sufficient degree and the mat may have reduced strength. This is the reason why it is preferred to polymerize and cure at temperatures greater than 50° C. Too slow polymerization and a similar failure of the coating to properly redistribute itself on the fiber surfaces may also occur if there is insufficient catalyst in the mixture or if the mixture contains too much water relative to the amount of catalyst.

All things considered it is felt that the coating mixture should comprise at least 70%, by weight, and preferably at least 85% furfuryl alcohol, the balance being catalyst and water. If the catalyst is phosphoric acid the mixture should contain anywhere from 0.25 to 5%, by weight, of an aqueous solution of 85% $H_3PO_4$ or an equivalent amount of $H_3PO_4$ if a different strength solution is used. Generally at least as much water as $H_3PO_4$ must be present in the mixture. We have used mixtures containing 20 times as much water as $H_3PO_4$. Some weak catalysts may not require water.

The final step in the process is to carbonize the cured resin. Impurities are eliminated and the corrosion resistance of the substrate to chemicals, such as phosphoric acid, improves as the maximum heat treatment temperature is increased. Electrical and thermal conductivity also improves as the heat treatment temperature is raised. If, as in this exemplary embodiment, the carbon sheet is to be used as a fuel cell electrode substrate in a hot phosphoric acid environment then it should be heat treated or carbonized to at least 1500° C. and preferably to at least 1900° C. For other applications a heat treatment temperature as low as 1300° C. may be adequate. This carbonization must be done in an inert atmosphere or a vacuum.

EXAMPLE I

A coating mixture was prepared by mixing 67 ml of furfuryl alcohol with 10 ml of a sol made from 125 ml of water plus 2.5 ml of 85% $H_3PO_4$. The mixture was placed in a large container. A portion of the mixture was removed from the container and blended with an estimated 2.2 grams of chopped Union Carbide pitch fibers to form a slurry. The fibers used were on the order of 0.1 inch in length. The amount of fibers was calculated to yield a part having the desired porosity and dimensions. A frame having four sides and a screen bottom was lowered into the large container of the alcohol mixture, and the slurry was poured into the frame. The slurry was permitted to settle for two or three minutes and then the frame was lifted out of the solution with the fiber on the screen in a thin, uniform layer approximately 1 foot square and 0.013 inch thick. The screen, with the layer or mat of fibers on top, was removed from the frame and a drying screen was placed on top of the fibers. The two screens were flipped over and the frame screen removed leaving the fiber layer on the drying screen. Excess liquid was allowed to drain from the layer. The mat of fibers was dried in an oven at 220° F. (104° C.) for 1 hour to polymerize the furfuryl alcohol and fully cure the resin so formed. The cured mat was then carbonized to a temperature between 2600° and 3000° C. in an inert atmosphere over a period of 3 weeks. The heating cycle used during the carbonization step is not considered to be a part of the present invention, and other heat treatment cycles which take substantially less than three weeks, such as on the order of 5 or 6 days or even less may be used.

The substrate made by the method of the foregoing example had a porosity of 85%, a mean pore size of 72 microns, a tear strength of 452 grams, electrical resistance of 0.003 ohm/cm and a diffusivity of 0.10 $cm^2$/sec. Its performance in a fuel cell was comparable to substrates which we had been using prior to the discovery of the present method. Additionally, the substrate is about 10% more porous than these earlier substrates with no significant loss of strength.

EXAMPLE II

Another electrode substrate was made using the same procedure as in Example I except the coating mixture was prepared by mixing 95.0 gms furfuryl alcohol, 5.0 gms of 85% $H_3PO_4$ and 5.0 gms of water. The substrate made was of the same size and porosity as the substrate of Example I. Its properties were also similar to the substrate of Example I.

Although the invention has been shown and described with respect to a preferred embodiment thereof, it should be understood by those skilled in the art that other various changes and omissions in the form and detailed thereof may be made therein without departing from the spirit and the scope of the invention.

Having thus described a typical embodiment of our invention, that which we claim as new and desire to secure by Letters Patent of the United States is:

1. A method for fabricating a porous carbon sheet comprising the steps of:
   coating chopped carbon fibers with a low viscosity mixture of at least 70% by weight furfuryl alcohol, 0.25–5%, by weight, of an aqueous solution of 85% phosphoric acid or an equivalent amount of phosphoric acid, and a balance of water;
   forming a mat of said coated fibers;
   polymerizing the furfuryl alcohol and curing the mat by heating the mat to a temperature between 50°–200° C.; and
   carbonizing the cured mat by heating to at least 1500° C.

2. The method according to claim 1 wherein the step of polymerizing the furfuryl alcohol and curing the mat is accomplished by heating the mat to a temperature between 100°–150° C.

3. The method according to claim 1 wherein the step of polymerizing the furfuryl alcohol and curing the mat is done in an oxidizing atmosphere.

4. The method according to claim 1 wherein said mixture is at least 85% furfuryl alcohol.

5. A method for fabricating an electrochemical cell electrode substrate comprising the steps of:
   coating chopped carbon fibers with a low viscosity mixture of at least 70% furfuryl alcohol, 0.25–5%, by weight, of an aqueous solution of 85% phosphoric acid or an equivalent amount of phosphoric acid, and a balance of water, said step of coating including dispersing said fibers in a bath of said mixture;
   forming a mat of said coated fibers, including permitting said dispersed fibers to settle onto a screen disposed in said bath;
   polymerizing the furfuryl alcohol and curing the mat by heating the mat to a temperature between 50°–200° C. in an oxidizing atmosphere; and
   carbonizing the cured mat by heating to at least 1500° C.

6. The method according to claim 5 wherein said mixture includes at least 85% by weight furfuryl alcohol, and said step of polymerizing and curing the mat includes heating to a temperature between 100°–150° C.

7. The method according to claim 5 wherein said step of carbonizing includes heating the cured mat to at least 1900° C.

8. The method according to claim 5 wherein the carbon fibers are less than about 2 inches in length.

9. A method for fabricating a fuel cell electrode substrate comprising the steps of:
   coating chopped carbon pitch fibers which are less than about two inches in length with a mixture of at least 85% furfuryl alcohol, 0.25–5%, by weight, of an aqueous solution of 85% phosphoric acid or an equivalent amount of phosphoric acid, and a balance of water, said step of coating including dispersing said fibers in a bath of said mixture;
   forming a mat of said coated fibers, including permitting said dispersed fibers to settle onto a screen disposed in said bath;
   polymerizing the furfuryl alcohol and fully curing the mat by heating the mat to a temperature between 100°–150° C. in an oxidizing atmosphere; and
   carbonizing the cured mat by heating to at least 1900° C.

* * * * *